United States Patent [19]
Opinsky et al.

[11] 3,983,204
[45] Sept. 28, 1976

[54] RECESSED LAST AND METHOD OF LASTING AND MOLDING A SHOE SOLE TO UPPER INCLUDING POSITIONING INSOLE IN RECESSED LAST

[75] Inventors: Jerome L. Opinsky, Joppatowne, Md.; Ralph D. Stewart, Naugatuck, Conn.

[73] Assignee: Uniroyal, Inc., New York, N.Y.

[22] Filed: July 14, 1971

[21] Appl. No.: 162,508

Related U.S. Application Data
[62] Division of Ser. No. 812,832, April 2, 1969, abandoned.

[52] U.S. Cl. .............................. 264/244; 12/133 R; 12/145; 264/263; 264/275; 425/119
[51] Int. Cl.² .............................................. B29f 1/00
[58] Field of Search ............... 264/244, 275, 263; 425/119; 12/128 D, 33.6, 133 R, 142 T

[56] References Cited
UNITED STATES PATENTS
3,246,068  4/1966  Ferreira ........................... 264/244
3,510,968  5/1970  Hobbs, et al. .................. 264/244 X FOREIGN PATENTS OR APPLICATIONS
840,029  12/1958  United Kingdom ................ 264/244

Primary Examiner—Donald J. Arnold
Assistant Examiner—W. E. Hoag
Attorney, Agent, or Firm—Norbert P. Holler

[57] ABSTRACT

A recessed last, and a method of using same in lasting an upper and insole and molding a sole thereto, including inserting an insole in the recess of the last and retaining the insole in position during molding by the edges of the lasted upper.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

11 Claims, 4 Drawing Figures

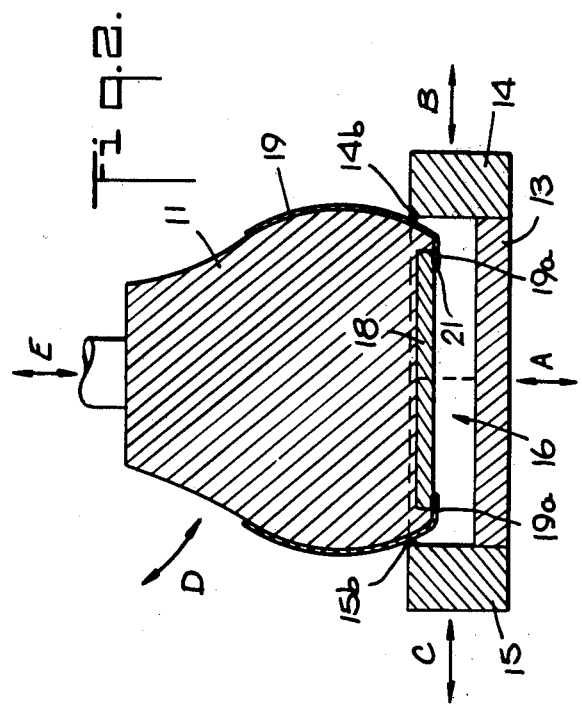
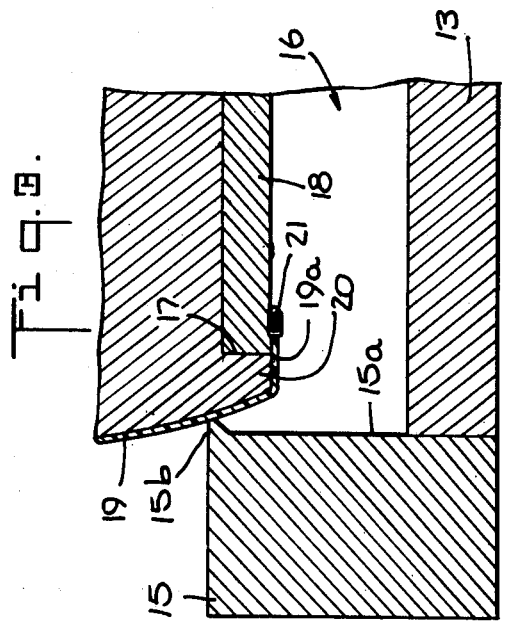
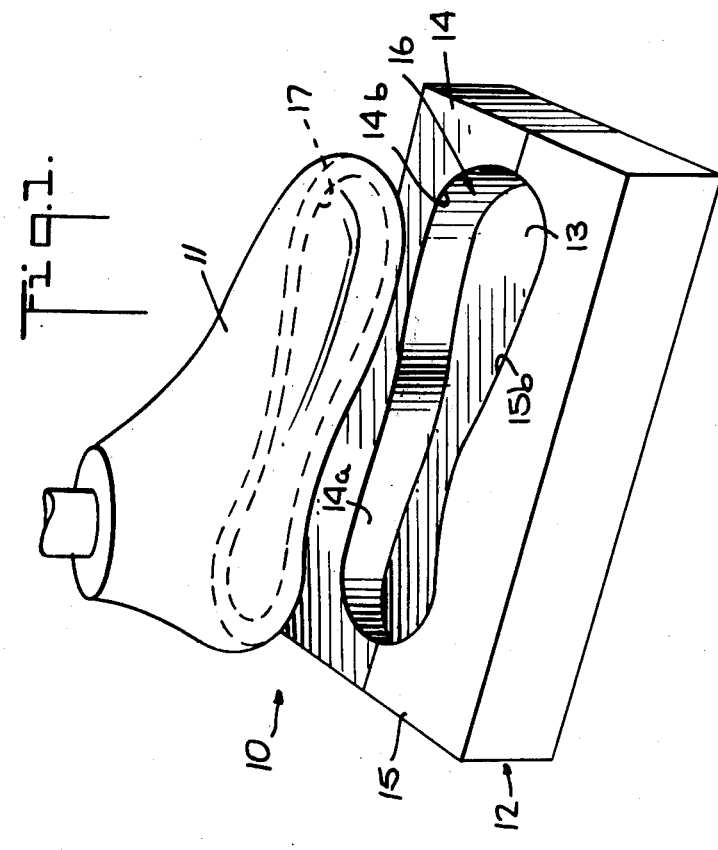
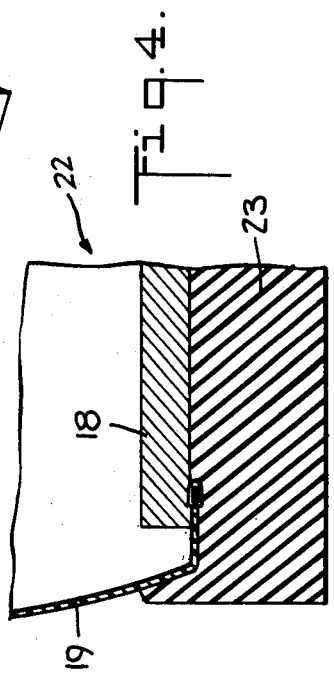

RECESSED LAST AND METHOD OF LASTING AND MOLDING A SHOE SOLE TO UPPER INCLUDING POSITIONING INSOLE IN RECESSED LAST

This is a division of application Ser. No. 812,832 filed Apr. 2, 1969, now abandoned.

This invention relates to the art of manufacturing footwear with molded soles.

In the production of machine-made footwear with in situ injection or compression molded outsoles of plastic or elastomeric material, a continuing source of trouble has been the task of inserting the insole component into such an item of footwear so as to be properly and securely positioned in the same throughout the expected service life thereof. One known method of making such footwear of which we are aware involves the steps of lasting the upper on a last, placing the last with the upper thereon over the open top of a mold cavity, injection molding or compression molding the sole-forming composition directly to the bottom margin of the lasted upper in the mold cavity, and, after the solidification and/or curing of the outsole, removing the upper and sole combination from the last, inserting the insole, and securing it in place in the interior of the footwear item by means of an adhesive.

One of the disadvantges of this manufacturing method is that it is necessary for the operator, when inserting the insole, to handle the virtually completed footwear item, which in the case of footwear with light-colored fabric uppers greatly enhances the likelihood of the finished item becoming soiled. Another disadvantage is that an operator requires a considerable amount of practice and experience in order to be able to properly position the insole in the footwear, i.e. so as to be sure that the exposed upper surface of the outsole is adequately covered and to keep the relatively flexible insole from becoming wrinkled. Yet another disadvantage is that the securing of the insole in place generally requires a cold setting or drying adhesive, which, it has been found, frequently results in an adhesive bond of less strength than is required.

It is an object of the present invention, therefore, to provide means by which the aforesaid disadvantages and drawbacks can be efficaciously avoided.

A more specific object of the present invention is the provision of means enabling an accurate positioning of the insole relative to both the lasted upper and the outsole during the molding of the latter, so as to enable a firm, practically indestructable bond to be created therebetween by virtue of the molding of the outsole and without any need for further manual operations.

Generally speaking, the objectives of the present invention are attained by the provision, in the bottom of the last, of a recess dimensioned and contoured in accordance with the shape of the insole, so that when an insole is positioned in the recess, it will be retained therein by the marginal regions of the upper drawn over the peripheral rim bounding the said recess. This ensures that there will be no displacement of the insole relative to the last while the mold is being closed, and that the insole will be in its proper location relative to the upper during the molding of the outsole to the upper and the insole.

The foregoing and other objects, characteristics and advantages of the present invention will be more clearly understood from the following detailed description thereof when read in conjunction with the accompanying drawing, in which:

FIG. 1 is a perspective illustration of an open footwear sole mold utilizing a last constructed in accordance with the principles of the present invention;

FIG. 2 is a transverse vertical section through the mold in closed condition, preparatory to the solemolding operation;

FIG. 3 is a detail illustration, on an enlarged scale, of the circled portion of the structure shown in FIG. 2; and FIG. 4 is a fragmentary transverse section through an article of footwer manufactured by means of the mold shown in FIGS. 1 to 3.

Referring now to the drawing in greater detail, conventionally the basic elements of a footwear sole mold 10 are a last 11 and a cavity structure 12, the latter essentially consisting of a bottom plate 13 and a pair of complementary side plates 14 and 15. In the usual arrangement of these elements, see FIG. 2, the bottom plate 13 is arranged for vertical reciprocal movement, as indicated by the arrow A, on a suitable ram or other support (not shown), the side plates 14 and 15 are arranged for horizontal reciprocal movement toward and away from each other and the bottom plate 13, as indicated by the arrows B and C, and the last 11 is arranged for angular and vertical reciprocal movement, as indicated by the arrows D and E, between its illustrated upright position and an inverted position (not shown). The inwardly directed surfaces 14a and 15a of the side plates 14 and 15 are contoured so as to define, when the latter are in the illustrated positions thereof, the side walls of a cavity 16 the dimensions and shape of which are those of the footwear outsole to be molded. Suitable heating means (not shown), may be provided in or in association with the cavity structure 12 and the last 11.

The present invention resides in a modification of the last 11 to enable an insole to be accurately located and supported thereon during the sole-molding operation. To this end, there is provided in the bottom of the last a recess 17 the dimensions and shape of which are essentially those of the insole to be incorporated in the footwear item being manufactured. Preferably, the depth of the recess should be either equal to or slightly greater than the thickness of the insole.

In use, generally while the last is inverted from the position shown in FIGS. 1 and 2, an insole 18, which may be made of sponge rubber, non-cellular rubber, bonded cork, fiberboard, etc., is placed into the recess 17 and an upper 19 is then lasted on the last, the lower marginal regions 19a of the upper being drawn over the peripheral rim 20 bounding the recess 17. The rim may be as narrow as feasible, subject only to the requirement that it be sufficiently strong to resist collapse under the lasting forces applied thereto. We have found a rim thickness of about .030 inch to be a practical minimum. In the illustrated arrangement, the opposed edges of the marginal regions 19a of the upper are shown as drawn under the last by means of a string 21, but other lasting arrangements, utilizing a net or mesh fabric or the like providing an adequate amount of strike-through space for the molding composition, and other means for retaining the insole in the recess preparatory to the molding operation, may be used.

The last 11 is then moved to its upright position and lowered against the cavity structure 12 until the top edges 14b and 15b of the side plates 14 and 15 engage the last, with a suitable amount of a sole-molding composition being introduced into the cavity 16 either prior or subsequent to the closing of the cavity, depending on the particular method of compression molding or injection molding used. Either of the side plates 14 and 15 or the bottom plate 13 may also be provided with a suitable inlet orifice or passageway (not shown) to enable injection of the molding composition. The molding composition may be polyvinyl chloride, polyurethane, natural or synthetic rubber, or the like, and if desired may include a blowing agent to provide a foam or cellular sole. With the mold closed under appropriate pressure, the molding composition will then solidify by fusion, cooling or curing, as the case may be, and the resultant outsole thereupon will be intimately bonded to the bottom portions of the upper 19 confined in the mold cavity as well as to the insole 18 confined in the recess 17. If desired, the strength of the bond between the outsole and the insole may be further enhanced by providing a fabric facing integral with the insole on the lower surface thereof or by precoating the latter with a heat-activatable adhesive material such as a thermoplastic urethane.

At the end of the molding operation, the mold is opened and the completed footwear item 22 (FIG. 4) having an outsole 23 molded directly to the insole 18 and upper 19 removed from the last. There will, accordingly, be no further need for additional treatment of the insole, which is found to be firmly bonded to the outsole in precisely centered location and free of wrinkles or other deformations, whereby the possibility of the footwear becoming soiled is greatly reduced.

It will be understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims. Thus, although the invention has so far been described as applying to the incorporation of an insole in the article of footwear, the principles herein disclosed are applicable as well to the (incorporation of such items as arch cushions, heel pads, shank stiffeners, half insoles and the like in footwear, requiring in each case, of course, an appropriately shaped and dimensioned recess in the bottom of the last. Wherever the term "insole" is used in the specification and claims, therefore, it is to be interpreted in the broader sense of referring to any such footwear component.

Having thus described our invention, what we claim and desire to protect by Letters Patent is:

1. A process of making an article of footwear comprising:

positioning a last with its sole-surface facing upwardly;

placing an insole into a correspondingly contoured and dimensioned recess provided at the sole-surface of the last, said recess defining a wall surrounding the peripheral edge of the insole for peripherally engaging the insole so as to prevent lateral movement of said insole with respect to said last;

positioning an upper on said last with the sole-engaging margin of the lasted upper extending inwardly beyond the walls of said recess into overlying relation with the margin of said insole;

inverting the lasted upper so that its sole-surface faces downwardly, said insole being retained in said recess solely by said sole-engaging margin of said upper and accurately located with respect to said upper by the peripheral engagement with the wall of said recess;

placing the lasted upper and retained insole into a mold cavity with the insole facing downwardly, and forming in said mold cavity an outsole adhering both to said insole and to the bottom of said lasted upper, said step of forming the outsole comprising molding an outsole to said upper and to said insole in said mold cavity while peripherally engaging and positively locating the insole relative to the lasted upper during the molding operation without the need for additional fastening means.

2. The method of making a shoe with an insole and an outsole, the latter being comprised of an elastomer, comprising supporting the insole on the bottom of a last, providing an upper with a lasting string along its lasting margin, placing the upper on the last with its lasting margin projecting upwardly from the bottom, holding the margin spaced from the edge of the insole, drawing said lasting string tight to pull the lasting margin inwardly over the bottom of the insole while holding the margin spaced from the edge of the insole, supporting said string-lasted upper in engagement with a mold containing a cavity corresponding in dimensions to the outsole to be applied, and injecting an elastomeric bottom-forming composition into said cavity against the insole and lasting margin.

3. A last for use in making a shoe according to claim 2, said last having at its bottom an upstanding peripherally disposed lip, said lip defining a cavity at the bottom corresponding in configuration to the shape of the insole and in depth to the thickness of the insole.

4. The method of making a shoe with an insole and an outsole, the latter being comprised of an elastomer, comprising supporting the insole on the bottom of a last, providing an upper with a lasting string along its lasting margin, placing the upper on the last with its lasting margin projecting upwardly from the bottom, providing spacing means between the edge face of the insole at the inner side of the upwardly projecting lasting margin for holding the lasting margin spaced from the edge of the insole, drawing the lasting string tight to pull the lasting margin inwardly over the bottom while held out of engagement with the edge face of the insole, supporting the lasted upper in engagement with a mold containing a cavity corresponding in dimensions to the outsole to be applied, and injecting an elastomeric bottom-forming composition into the cavity against the insole and surrounding lasting margin.

5. The method of making a shoe with an insole and an outsole, the latter being comprised of an elastomer, comprising placing the insole on the bottom of a last, providing an upper with a lasting string along its lasting margin, mounting the upper on the last with its lasting margin projecting upwardly from the bottom, providing means at the edge of the last bottom between the edge face of the insole at the inner side of the upstanding lasting margin for constraining the insole against lateral movement on the bottom and for holding the lasting margin away from said edge face, drawing the lasting string tight to pull the lasting margin inwardly over the top of said means onto the insole while held out of engagement with the edge face by said means, supporting the lasted upper in engagement with a mold containing a cavity corresponding to the dimensions of the outsole to be applied, and injecting an elastomeric bottom-forming composition into the cavity against the insole and the lasting margin.

6. The method of string-lasting an upper onto an insole supported on a last for making a shoe provided with an insole and an elastomeric outsole, comprising placing the insole on the bottom of the last, providing an upper with a lasting string along its lasting margin, mounting the upper on the last with its lasting margin projecting upwardly from the bottom, holding the inner side of the lasting margin spaced from the edge of the insole, and while so holding the lasting margin spaced from the edge of the insole drawing the lasting string tight to pull the lasting margin inwardly onto the bottom of the insole.

7. The method of string-lasting an upper onto an insole supported on a last preparatory to making a shoe with an insole and an elastomeric outsole, comprising placing the insole on the bottom of the last, providing an upper with a lasting string along its lasting margin, placing the upper on the last with the lasting margin projecting upwardly from the bottom, providing at the edge of the last bottom a spacing member having a smooth outer surface forming a continuation of the side surface of the last, a smooth top surface substantially flush with said exposed surface of the insole, and an inner surface of a configuration such as to have contact with the edge face of the insole, and drawing the lasting string tight to pull the lasting margin inwardly over said spacer onto the the exposed surface of the insole.

8. The method of string-lasting an upper to an insole supported on a last preparatory to making a shoe with an insole and an elastomeric outsole, comprising placing an adhesive-coated insole on the bottom of the last with the adhesive-coated side exposed, providing an upper with a lasting string along its lasting margin, mounting the upper on the last with its lasting margin projecting upwardly from the bottom of the last, and while holding the lasting margin spaced from the edge face of the insole drawing the lasting string tight to pull the lasting margin inwardly over the exposed surface of the insole.

9. The method of string-lasting an upper onto an insole supported on a last preparatory to making a shoe with an insole and an elastomeric outsole, comprising providing a last with an upstanding lip projecting from its bottom, said lip defining a cavity at the bottom corresponding in shape and depth to the shape and thickness of the insole, said lip having an outer surface forming a continuation of the side surface of the last and a top surface substantially flush with the exposed surface of the insole, placing the insole within said cavity and string-lasting an upper to the last to draw the lasting margin inwardly over the exposed surface of the insole.

10. A method according to claim 9, wherein the outer side and top of the lip are smooth and rigid.

11. A method according to claim 9, wherein the lip is formed integral with the bottom of the last.

* * * * *